United States Patent [19]
Coulter et al.

[11] Patent Number: 5,624,016
[45] Date of Patent: Apr. 29, 1997

[54] LOCKING APPARATUS FOR A KEYED CONNECTION

[75] Inventors: Tonya L. Coulter, Maple Grove; David R. Hennessy, Minneapolis, both of Minn.

[73] Assignee: Horton, Inc., Minneapolis, Minn.

[21] Appl. No.: 530,609

[22] Filed: Sep. 20, 1995

[51] Int. Cl.$^6$ .............................. F16D 67/04; F16D 1/08
[52] U.S. Cl. ....................... 192/110 S; 192/18 A; 403/358
[58] Field of Search .............. 192/110 S, 114 R, 192/85 A, 18 A; 403/355, 356, 358

[56] References Cited

U.S. PATENT DOCUMENTS

| | | | |
|---|---|---|---|
| 1,866,112 | 7/1932 | Kindlemann et al. | 402/358 |
| 2,535,729 | 12/1950 | Firth | 403/356 X |
| 2,676,063 | 4/1954 | Whitt | 403/358 X |
| 2,992,844 | 7/1961 | Williams | 403/358 |
| 2,994,548 | 8/1961 | McGogy . | |
| 3,424,019 | 1/1969 | Wolfram | 403/356 X |
| 3,702,200 | 11/1972 | Carman . | |
| 3,924,978 | 12/1975 | Loyd, Jr. et al. . | |
| 4,035,098 | 7/1977 | Griffin . | |
| 4,338,036 | 7/1982 | DeLeu . | |
| 4,348,132 | 9/1982 | Mullenberg . | |
| 4,411,550 | 10/1983 | Schutt et al. | 403/358 |
| 4,534,454 | 8/1985 | Brooks | 192/18 A |
| 4,633,989 | 1/1987 | Matson | 192/18 A |
| 4,682,069 | 7/1987 | Stahl . | |
| 4,695,183 | 9/1987 | Greenberg . | |
| 4,766,986 | 8/1988 | Dayen et al. | 192/18 A |
| 4,929,118 | 5/1990 | Anderson . | |
| 5,176,464 | 1/1993 | Tanner . | |
| 5,306,093 | 4/1994 | Elbert | 403/356 X |
| 5,400,885 | 3/1995 | Phillips . | |

OTHER PUBLICATIONS

PowerFlo ECB Clutch/Brake, The Carlson Company, Inc., 6045 North Broadway, Box 2822, Wichita, Kansas.

*Primary Examiner*—Andrea L. Pitts
*Attorney, Agent, or Firm*—Peterson, Wicks, Nemer & Kamrath, P.A.

[57] ABSTRACT

Apparatus (300) is disclosed for locking a key (322) in a keyway (302) of a shaft (10) and of a hub slideably receiving the shaft (10). The key (322) is tapered and includes a top extending at an acute angle to the bottom, with the keyway (302) of the shaft (10) having a bottom wall (306) at the acute angle to the axis of the shaft (10). A push rod (312) is rotatable in an axial bore (308) in the shaft (10) and includes a threaded portion (318) threaded into a threaded counterbore (310) of the axial bore (308). The forward end of the push rod (312) is interconnected to the key (322) by a lip (336) formed in the key (322) extending into a notch (316) formed in the push rod (312). Rotation of the push rod (312) causes the push rod (312) to move axially in the axial bore (308) which in turn axially moves the key (322) in the keyway (302). Due to the angles of the key (322) and the keyway (302), the radial spacing of the top (330) of the key (322) from the axis of the shaft (10) varies depending upon the axial position of the key (322) in the keyway (302).

20 Claims, 1 Drawing Sheet

LOCKING APPARATUS FOR A KEYED CONNECTION

BACKGROUND

The present invention generally relates to apparatus for torque transfer between a male shaft and a female hub, particularly to apparatus providing a keyed connection between a male shaft slideable within a female hub, and specifically to apparatus for locking a key between a male shaft slideable within a female hub.

Rotational control apparatus are often face mounted between an input unit and an output unit. As an example, clutch-brakes are typically ANSI and NEMA C face mounted between an electric motor and a gearbox. The method of torque transfer in these designs is a keyed shaft between the male motor shaft and the female clutch-brake hub and also between the male clutch-brake shaft and the female gearbox hub. Because of the cycling nature of the clutch-brake, the torque applied to each of these shaft/hub connections reverses. This reversing load has the tendency to result in an impact between the key and the keyways. Over time, these impacts begin to enlarge the keyways. The enlarged keyways cause greater impacts which accelerates the damage. Eventually the keys tend to roll the material around the keyway and cause a catastrophic failure.

Typical keyed shafts use set screws threaded in the hub and engaging the key to lock the key into the keyway. As an example, the female hub of clutch-brakes often have a set screw located over the keyway in the hub for locking the key into the keyway of the motor shaft. It can then be appreciated that access to this set screw must be provided such as via a pipe port in the side of the clutch-brake. Locking the key between the bottom of the keyway in the shaft and the bottom of the set screw (which effectively becomes the bottom of the keyway in the hub carried by the shaft) has proven to be very effective in eliminating any tendency for the key to roll and damage the keyways in keyed connections.

Gearboxes are made to ANSI and NEMA standards which dictate the hole size, key size, and depth of bore. Because of this, the manufacturers of gearboxes have not made accommodations to lock the keys in place. Thus, the keyed connection between the male shaft of the clutch-brake and the female hub of the gearbox encounter problems of keyway damage due to reverse loading.

Various solutions have been previously utilized by manufacturers of clutch-brakes to lock the male shaft of the clutch-brake to the female hub of the gearbox for transferring torque therebetween. However, such solutions encounter various drawbacks including but not limited to complexity, strength, and lack of positive engagement.

Thus, a need continues to exist to provide a manner of providing positive torque transfer from a male shaft to a female hub slideably receiving the male shaft. In preferred aspects of the present invention, a need continues to exist to provide a manner to lock the key in a keyway when locking accommodations are not available in the female hub.

SUMMARY

The present invention solves this need and other problems in the field of torque transfer between a male shaft and a shaft carried article by providing, in the preferred form, a key having a top extending at an acute angle to a bottom, slideable in a keyway of the male shaft including a keyway having a bottom wall extending at the acute angle to the axis of the shaft, and engaged by the forward end of a push rod axially movable in an axial bore in the shaft intersecting with the keyway.

In preferred aspects of the present invention, the forward end of the push rod is interconnected to the key to push the key in the keyway in either axial direction. Further, the push rod is rotatable in the axial bore and includes a threaded portion threaded into a threaded counterbore of the axial bore, with axial movement of the push rod occurring as the result of rotation of the push rod.

It is then an object of the present invention to provide a novel apparatus for torque transfer between a male shaft and a shaft carried article.

It is further an object of the present invention to provide such a novel apparatus providing a keyed connection between the shaft and the article.

It is further an object of the present invention to provide such a novel apparatus locking a key between the shaft and the article.

It is further an object of the present invention to provide such a novel apparatus which provides positive engagement and does not rely on friction between the shaft and the article alone to transmit the torque.

It is further an object of the present invention to provide such a novel apparatus which is not complex and can be made with very simple manufacturing processes.

It is further an object of the present invention to provide such a novel apparatus providing a strong interconnection.

It is further an object of the present invention to provide such a novel apparatus overcoming the drawbacks of prior attempts to provide torque transfer between a male shaft and a shaft carried article.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
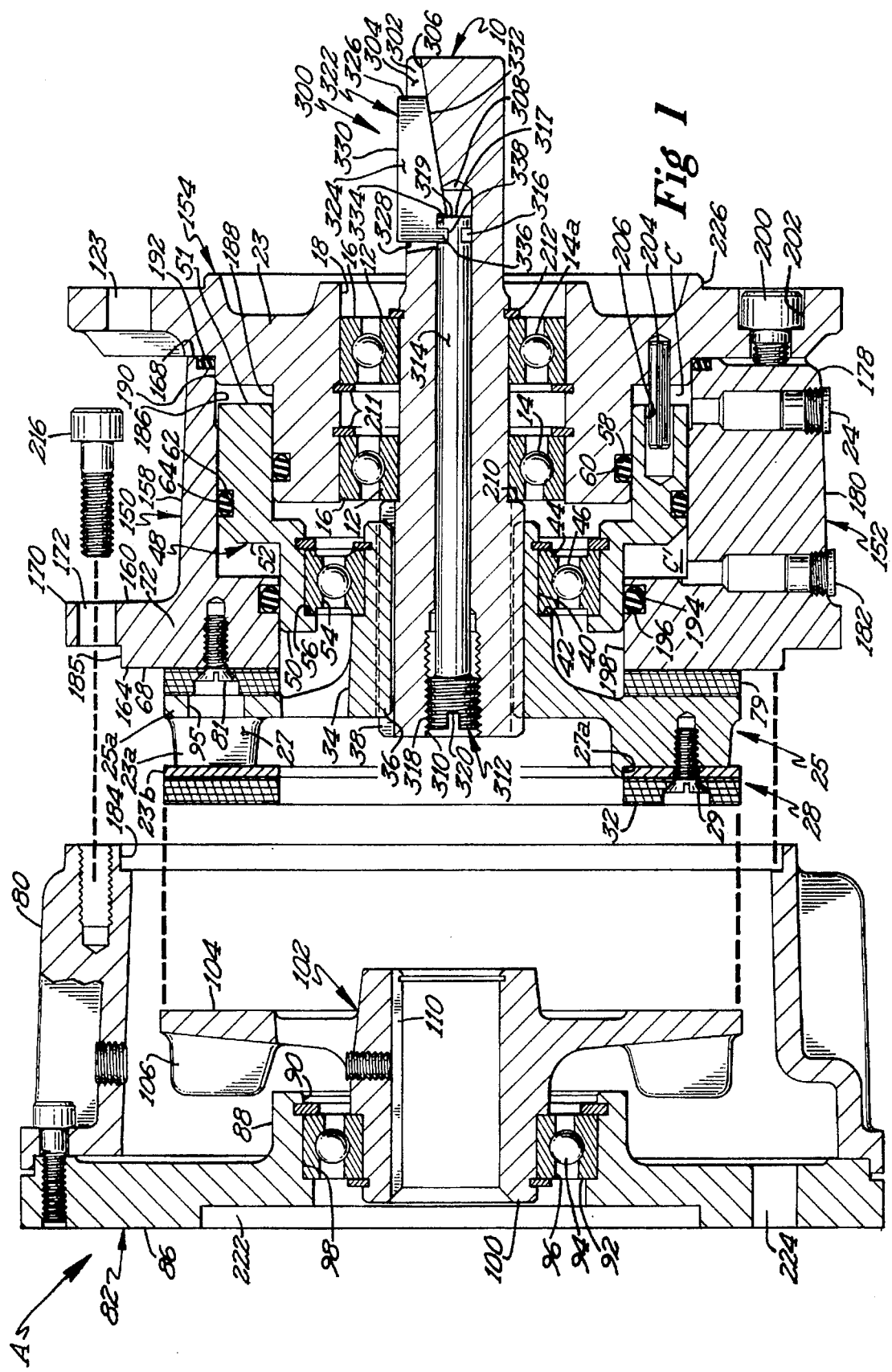
FIG. 1 shows a cross sectional view of a clutch-brake according to the preferred teachings of the present invention.

The Figure is drawn for ease of explanation of the basic teachings of the present invention only; the extensions of the Figure with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the drawings, the same numerals designate the same or similar parts. Furthermore, when the terms "top", "bottom", "inward", "outward", "first", "second", "inside", "outside", "radially", "axially", "circumferentially", and similar terms are used herein, it should be understood that these terms have reference only to the structure shown in the drawings as it would appear to a person viewing the drawings and are utilized only to facilitate describing the invention.

DESCRIPTION

An apparatus for locking a key in the shaft of an apparatus for providing rotational control of an output with an input and a housing according to the teachings of the present invention is shown in the drawings and is generally designated 300. In the most preferred embodiment of the present invention, rotational control apparatus A is a clutch-brake of the type shown and described in U.S. Pat. No. 4,766,986. For purpose of explanation of the basic teachings of the present invention, the same numerals designate the same or similar parts in the present figures and the figures of U.S. Pat. No. 4,766,986. The description of the common numerals and the clutch-brake A may be found herein and in U.S. Pat. No. 4,766,986, which is hereby incorporated herein by reference.

Referring to the drawings in detail, the clutch-brake A includes the driven rotatable output shaft 10. Further provided is the interface disc shown in its preferred form as friction disc 28. In the preferred embodiment, friction disc 28 includes a flat ring portion 23b and a friction interface element 25. Friction interface element 25 includes a flat ring portion 25a having circumferentially spaced, radially extending webs 27 upstanding from the face opposite to the interface surface thereof. Axially extending openings 95 of the type shown and described in U.S. Pat. No. 4,078,637, which is hereby incorporated by reference, are formed in the flat ring portion 25a intermediate webs 27. Webs 27 include axially extending shoulders 27a for receipt of the radially inward axially extending opening of flat ring portion 23b. Bolts 29 threadably received in webs 27 extend through and secure a friction lining ring 32 and the flat ring portion 23b to friction interface element 25 with the face opposite to the interface surface of ring portion 23b abutting with the free ends of webs 27 and spaced from the face of ring portion 25a to form spaced cutouts 23a for heat venting. The friction interface element 25 of disc 28 terminates radially inwardly in the hollow hub 34 formed with splines 36 slideably engaged with splines 38 of shaft 10. Formed on the hub 34 is the annular recess 40 forming the shoulder 42. Mounted in the recess 40 and against the shoulder 42 is the inner race 44 of bearing 46.

The numeral 48 designates an annular piston which includes the axially disposed annular flange portion 50. The outer race 54 of bearing 46 is mounted on the inner surface of piston flange portion 50 and against the shoulder 56 thereby rotatably mounting shaft 10 and a portion of hub 34 within piston 48.

In the preferred embodiment according to the teachings of the present invention, clutch-brake A includes a housing 150 of an improved construction including modular, interchangeable components 82, 152, and 154. Specifically, housing 150 includes a cylindrical body portion 152 having a first, generally axially extending annular member 158 which intersects with a second, generally radially extending annular member 160. Member 158 includes a first, free annular end 164 and a second, free annular end 168. In the most preferred form, annular recess 186 is provided in the radially inward diameter of annular member 158 and adjacent end 168 for allowing ease of assembly.

In the preferred embodiment, member 160 includes an integral, annular body portion 72 located radially inwardly of annular member 158 and extending from the first end 164 toward its second end 168. Annular body portion 72 includes a backing portion 68 for mounting thereon the second, fixed interface member shown as friction lining ring 79 opposite friction interface element 25 of friction disc 28. Friction lining ring 79 in its most preferred form is formed of two, half-moon pieces to allow radial removal without removing friction interface element 25 and is secured by bolts 81 to backing portion 68.

In the preferred embodiment, member 160 further includes an annular, radially extending mounting flange 170 having circumferentially spaced, axially extending apertures 172. Flange 170 is generally located adjacent end 164 of annular member 158 such that body portion 72 is slightly offset from flange 170 and flange 170 is located axially inward of end 164 and of friction lining 79 secured to annular body portion 72.

Body portion 152 further includes in its most preferred form, integral, axially extending, circumferentially spaced fins extending from annular member 158 from flange 170 to a point slightly axially spaced inwardly of end 168. Axially extending, circumferentially spaced mounting shoulders 178 are further provided in the preferred embodiment extending from annular member 158 from flange 170 to end 168 and circumferentially spaced from the fins. One of the shoulders 178 in the preferred embodiment includes a port enlargement 180 including axially spaced, radially extending air ports 24 and 182.

In the preferred embodiment, housing end 154 is generally planar and circular in configuration having a diameter larger than annular member 158 of cylindrical body portion 152. End 154 includes axially extending, integral, two step projection 23 having a circular opening 18, radially intermediate axially extending surface 188, and radially outward axially extending surface 190 in its most preferred form. Surface 190 has a diameter generally equal to recess 186 and for receipt therein. End 154 is removably secured to cylindrical body portion 152 in its most preferred form by bolts 200 extending through circumferentially spaced, axially extending apertures 202 formed in end 154 and threadably received in mounting shoulders 178 of cylindrical body portion 152. In the most preferred form, apertures 202 include counter sunk entries for receipt of the heads of bolts 200. Suitable fluid sealing provisions 192 such as an O-ring is provided in the preferred embodiment between surface 190 of projection 23 of end 154 and cylindrical body portion 152.

In its most preferred form, annular piston 48 is generally Z-shaped and includes a second, axially disposed annular flange portion 51 and annular portion 52 extending radially between the ends of portions 50 and 51. The radially outer surface of portion 51 is complementary to and for sliding receipt within cylindrical body portion 152 and includes suitable sealing provisions therebetween such as O-ring 64 received within groove 62 formed in the radially outer surface of portion 51. The radially inner surface of portion 51 is complementary to and for sliding receipt on surface 188 of projection 23 and includes suitable sealing provisions therebetween such as O-ring 60 received within groove 58 formed in surface 188 of projection 23. The radially outer surface of portion 50 is complementary to and for sliding receipt within radially inward, axially extending surface 198 of body portion 72 and includes suitable sealing provisions therebetween such as O-ring 196 received within groove 194 formed in surface 198 of body portion 72.

It will be seen that piston 48, bearing 46, hub 34 and friction disc 28 thereof are all slideable on shaft 10. It will be further seen that the void defined by piston 48, cylindrical body portion 152, and end 154 forms a cylinder C to which there is communication by air port 24. It will be further seen that the void defined by piston 48, cylindrical body portion 152, and body portion 72 forms a cylinder C' to which there is communication by air port 182. For rotatably relating piston 48 to housing 150, an antirotation pin 204 shown in its preferred form as a spring pin is secured in end 154 and is slideably received in an aperture 206 formed in the free end of annular flange portion 51 of piston 48. It can then be appreciated that the particular arrangement of pin 204 and its interrelationship to piston 48 and housing end 154 are advantageous in regard to formation of the apertures for receiving pin 204 without wall break through.

Mounted on shaft 10 are the inner races 12 of bearings 14 and 14a with the outer races 16 mounted in the circular opening 18 of housing end 154. Races 12 and 16 of bearings 14 and 14a are retained by a shoulder 210 formed on shaft 10, by retaining rings 211 secured in opening 18 of housing end 154, and by retaining ring 212 secured on shaft 10.

Axially extending portion 80 of housing end 82 terminates at its outer edge in the ring like and radially disposed outer end wall 86. In the most preferred form, end wall 86 and portion 80 are formed by separate components secured together such as by bolts as shown. Extending inwardly and axially of the wall 86 is the annular flange 88 which has formed on the inner surface thereof the annular recess 90 in which is mounted the outer race 92 of bearing 94. The inner race 96 of bearing 94 is mounted in recess 98 formed on hub 100 of friction disc 102 having friction face 104. The disc 102 is equipped with the spaced cooling fins 106 and the hub 100 is keyed to the live input shaft of a motor or other source of power by means of the keyway 110. Thus, as the power source shaft rotates so does the disc 102.

In the preferred embodiment, the inner diameter of portion 80 is greater than the outer diameter of axially extending annular member 158. The inner edge of portion 80 includes an annular recess 184 provided in the inner diameter of portion 80 of a size and shape complementary to and for slideable receipt on an axially extending shoulder 185 integrally formed on mounting flange 170 of free end 164 of cylindrical body portion 152. Stationary input housing 82 is removably secured to body portion 152 in its most preferred form by bolts 216 extending through apertures 172 and threadably received in the inner edge of portion 80.

It can then be appreciated that friction discs 28 and 102 are not directly interconnected together, but are only interconnected together through their separate interconnection to housing 150 according to the teachings of the present invention. Therefor, no vibration is transferred between the power source shaft received in hub 100 of friction disc 102 and output shaft 10 due to off center mounting of clutch-brake A. Vibration may cause noise and premature component wear. Thus, rubber coating of splines 36 and/or 38 or other techniques to compensate for vibration are not necessary, reducing the cost of manufacture of clutch-brake A according to the teachings of the present invention.

Stationary input housing 82 includes provisions for mounting housing 150 and clutch-brake A to the motor or other source of power such as by a female C-face 222 and by cap screws received in circumferentially spaced, axially extending apertures 224. End 154 includes provisions for mounting housing 150 and clutch-brake A to the output apparatus such as a gear reducer such as by a male C-face 226 and by circumferentially spaced, axially extending, apertures 123 for receipt of bolts extending from the gear reducer.

It will be seen that with no air pressure in cylinder C and upon introducing fluid pressure into cylinder C' by a source (not shown) connected to port 182, piston 48 moves towards end 154 whereby flat ring portion 25a of disc 28 is made to contact lining 79 and through hub 34 brake shaft 10. With no air pressure in cylinder C' and upon introducing fluid pressure into cylinder C by a source (not shown) connected to inlet 24, piston 48 moves towards stationary input housing 82 whereby flat ring portion 25a is separated from lining 79 and as a result there is no braking of shaft 10, and friction lining 32 contacts face 104 of live friction disc 102 whereby shaft 10 is clutched in.

According to the teachings of the present invention, shaft 10 includes a keyway 302 extending axially from the free end of shaft 10 towards but spaced from housing end 154. Keyway 302 includes first and second, planar, spaced, parallel sidewalls 304 extending in planes parallel to the axis of shaft 10. Keyway 302 further includes a planar bottom wall 306 extending between and perpendicular to sidewalls 304. Bottom wall 306 extends at an acute angle in the order of 10° from the axis of shaft 10, with the depth of keyway 302 increasing from the free end of shaft 10 towards but spaced from housing end 154.

Shaft 10 further includes an axial bore 308 of circular cross sections of a constant size extending from the internal end of shaft 10 towards but spaced from the free end of shaft 10 and intersecting with keyway 302. In the most preferred form, bore 308 extends approximately 40% of the axial length of keyway 302. The internal end of bore 308 includes a threaded counterbore 310 extending from the internal end of shaft 10 towards but spaced from the end of bore 308, with counterbore 310 axially extending approximately 25% of the length of bore 308.

Apparatus 300 according to the preferred teachings of the present invention includes a push rod 312 having an axial length slightly less than that of bore 308. Push rod 312 generally includes a stem 314 having circular cross sections of a constant size generally equal to and for rotatable receipt in bore 308. Stem 314 includes an annular notch 316 adjacent to but spaced axially from the forward end 317 of stem 314. Notch 316 generally includes first and second annular, planar, parallel, radially extending, and axially spaced sidewalls and a cylindrical bottom wall concentric to the axis of rod 312 and extending generally perpendicular between the sidewalls of notch 316. An annular lip 319 is defined on stem 314 by and between forward end 317 and the first sidewall of notch 316. Push rod 312 further includes a threaded portion 318 on the end of stem 314 opposite notch 316. Threaded portion 318 is concentric to the axis of push rod 312 and of a size for threadable receipt in threaded counterbore 310. Threaded portion 318 includes suitable provision for rotating push rod 312 in bore 308 such as a slot 320 for receiving the end of a screwdriver. It can then be appreciated that by rotating push rod 312 in one direction, push rod 312 will move axially in bore 308 due to the threadable interconnection between portion 318 in counterbore 310, and by rotating push rod 312 in the opposite direction, push rod 312 will move axially in bore 308 in the opposite direction, with the direction of movement of push rod 312 axially into or out of bore 308 being dependent on whether the threads of portion 318 and counterbore 310 are right or left handed. Apparatus 300 according to the preferred teachings of the present invention further includes a wedge-shaped or tapered key 322. Key 322 includes first and second, planar, parallel sidewalls 324 spaced generally equal to and for slideable receipt between sidewalls 304 of keyway 302. Key 322 further includes first and second, planar, parallel end walls 326 and 328 extending between and perpendicular to sidewalls 324, with the distance between end walls 326 and 328 being substantially less than the axial length of keyway 302. Key 322 also includes a planar top wall 330 extending between and perpendicular to sidewalls 324 and end walls 326 and 328. Key 322 further includes a planar bottom wall 332 extending between and perpendicular to sidewalls 324 and extending from end wall 326 towards but spaced from end wall 328. Bottom wall 332 extends at an acute angle to top wall 330 generally equal to the angle of bottom wall 306 relative to the axis of shaft 10. Bottom wall 332 terminates in a notch 334. Notch 334 includes first and second planar, parallel sidewalls spaced a distance generally equal to the spacing between the first sidewall of notch 316 and forward end 317, with the sidewalls of notch 334 being parallel to and intermediate end walls 326 and 328. Notch 334 further includes a cylindrical bottom wall extending generally perpendicular between the sidewalls of notch 334. Notch 334 has a size and shape for rotatably receiving lip 319, with the bottom wall of notch 334 being of a size and shape corresponding to the outer surface of stem 314 and lip 319. Key 322 further includes a lip 336 defined by and between notch 334 and end wall 328. The thickness of lip 336 between the second sidewall of notch 334 and end wall 328 is generally equal to and for slideable receipt between the sidewalls of notch 316. Lip 336 further includes an arcuate bottom wall 338 of a size and shape corresponding to the bottom wall of notch 316. The depth of notch 334 in the most preferred form is generally equal to the height of lip 319 and the depth of notch 316 is generally equal to the height of lip 336.

It can then be appreciated that axial movement of push rod 312 in bore 308 causes axial movement of key 322 in keyway 302. Specifically, if push rod 312 is moved axially towards the free end of shaft 10, forward end 317 pushes against the first side wall of notch 334 and the second sidewall of notch 316 pushes against end wall 328 of lip 336 to push key 322 in keyway 302 towards the free end of shaft 10. Due to the incline of bottom wall 306, the radial spacing of top wall 330 of key 322 from the axis of shaft 10 increases as key 322 moves towards the free end of shaft 10. It should then be noted that due to the equal angles of bottom wall 332 to top wall 330 and of bottom wall 306 and the axis of shaft 10, top wall 330 always remains parallel to the axis of shaft 10 in all positions of key 322 in keyway 302. Further, due to the interconnection of forward end 317 to key 322, if push rod 312 is moved axially away from the free end of shaft 10, the first side wall of notch 316 pushes against the second sidewall of notch 334 and of lip 336 to push key 322 in keyway 302 away from the free end of shaft 10. Due to the incline of bottom wall 306, the radial spacing of top wall 330 of key 322 from the axis of shaft 10 decreases as key 322 moves away from the free end of shaft 10.

It can then be appreciated that due to the sidewalls of notches 316 and 334 and also forward end 317 lying in planes perpendicular to the axis of push rod 312 and due to the noninterfering/complementary shapes of the bottom wall of notch 316 and bottom wall 338 of key 322 and of the bottom wall of notch 334 and the outer surface of lip 319, push rod 312 is rotatable relative to key 322, with rotation of push rod 312 in bore 308 moving push rod 312 in bore 308 in the most preferred form due to the threaded connection between counterbore 310 and portion 318.

Now that the basic construction and operation of a preferred embodiment according to the teachings of the present invention have been set forth, subtle features and advantages of the present invention can be set forth and appreciated. Particularly, apparatus 300 and clutch-brake A according to the teachings of the present invention are particularly advantageous for installation. Specifically, clutch-brake A according to the teachings of the present invention can be separated into two major components, a first component including housing end 82 and friction disc 102 and a second component including body portion 152, housing end 154, friction disc 28, and piston 48 held together by the interconnection of body portion 152 and housing end 154 by bolts 200. Housing end 82 may then be interconnected to the power source by bolts extending through apertures 224 and body portion 152 may be interconnected to housing end 154 by bolts 216, with housing end 154 being interconnected to the output apparatus utilizing bolts received in apertures 123 either before or after the interconnection of body portion 152 to housing end 82. This feature is especially advantageous when the C-face is larger than the bore circle of apertures 224.

Furthermore, during the interconnection of housing end 154 to the output apparatus, shaft 10 is axially slid in a hub or like shaft carried article of the output apparatus. In particular, shaft 10 is rotated to align key 322 to be axially aligned with the keyway in the hub of the output apparatus, with key 322 axially positioned in keyway 302 spaced from its forward position such that top wall 330 is located a radial spacing from the axis of shaft 10 less than the bottom wall of the keyway of the hub. At this time, shaft 10 is axially slid in the hub with key 322 axially sliding in the keyway of the hub. When C-face 226 of housing end 154 mates with the complementary C-face of the housing of the output apparatus, push rod 312 is rotated such as by a screwdriver engaging slot 320 to move push rod 312 towards the free end of shaft 10. Push rod 312 is rotated until top wall 330 of key 322 abuts with the bottom wall of the keyway of the hub. It can then be appreciated that key 322 is locked in keyway 302 and the keyway of the hub and is prevented from moving radially by the abutment of bottom walls 306 and 332 and of top wall 330 with the bottom wall of the keyway of the hub. Key 322 is locked from moving circumferentially due to the abutment of sidewalls 324 with the sidewalls 304 of keyway 302 and with the sidewalls of the keyway of the hub. Further, key 322 is locked from moving axially toward the free end of shaft 10 due to the wedging effect between bottom wall 306 of keyway 302 and the bottom wall of the hub keyway created as top wall 330 increases its radial spacing as key 322 moves towards the free end of shaft 10 and also due to the interconnection of push rod 312 and key 322. Furthermore, key 322 is locked from moving axially away from the free end of shaft 10 due to the interconnection of push rod 312 and key 322 and specifically the abutment of forward end 317 against the first side wall of notch 334 and of the second sidewall of notch 316 against end wall 328. It should be appreciated that suitable provisions such as a locking patch can be added to prevent unintentional rotation of push rod 312 such as from vibration or reverse loading away from the locked position and thus allowing the key to loosen in keyway 302 and the hub keyway.

If it should be desired to remove the connection of housing end 154 to the output apparatus, after clutch-brake A has been separated into the two major components allowing access to slot 320, push rod 312 can be rotated to move key 322 away from the free end of shaft 12 and thus partially removing key 322 from the hub keyway. With key 322 partially removed from the hub keyway, shaft 10 can be axially removed from the hub keyway. It should be appreciated that due to the interconnection between key 322 and push rod 312, the abutment of end wall 328 with the end wall of keyway 302 prevents push rod 312 from being backed completely out of bore 308 when key 322 is positioned within keyway 302.

Now that the basic teachings of the present invention have been explained, many extensions and variations will be obvious to one having ordinary skill in the art. For example, although apparatus 300 in the most preferred form has been shown and described in connection with clutch-brake A and is believed to achieve synergistic results, it can be appreciated that apparatus 300 can be utilized according to the teachings of the present invention in other types and forms of rotational control apparatus in other applications where it is desired to transfer torque from a shaft to an article carried on the shaft such as a hub slideable on the shaft.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

We claim:

1. Apparatus for torque transfer to a shaft carried article including a keyway comprising, in combination: a shaft having an axis, a free end, and an opposite end, with the shaft carried article being mountable to the shaft; a shaft keyway formed in the shaft and including first and second sidewalls extending parallel to the axis of the shaft, with the shaft keyway having a bottom wall extending between the sidewalls and extending at an acute angle from the axis of the shaft; a key including first and second sides spaced for slideable receipt in the sidewalls of the shaft keyway, with the key having a top extending between the sides, with the key further having a bottom extending between the sides and extending at the acute angle from the top of the key, with the key being slideable in the keyway; an axial bore in the shaft extending from the opposite end and intersecting with the shaft keyway; a push rod movable axially in the axial bore and having a forward end engaging the key in the shaft keyway; and means for axially moving the push rod into and out of the axial bore.

2. The apparatus of claim 1 further comprising, in combination: means for interconnecting the forward end to the key.

3. The apparatus of claim 2 wherein the interconnecting means comprises, in combination: a notch formed in the push rod; and a lip formed in the key received in the notch of the push rod.

4. The apparatus of claim 3 wherein the notch formed in the push rod defines a lip in the push rod; and wherein the interconnecting means further comprises, in combination: a notch formed in the key for receiving the lip in the push rod, with the notch in the key defining the lip in the key.

5. The apparatus of claim 3 wherein the push rod is rotatable in the axial bore, with the notch of the push rod rotating relative to the lip of the key.

6. The apparatus of claim 5 wherein the axially moving means comprises, in combination: a threaded counterbore in the shaft extending from the opposite end and having an axial extent less than the axial bore; and a threaded portion for threadable receipt in the threaded counterbore, with rotation of the threaded portion moving the push rod in the axial bore.

7. The apparatus of claim 6 wherein the threaded portion is integral to the push rod.

8. The apparatus of claim 7 wherein the free end of the shaft is adapted to axially slide in the shaft carried article, with the keyway extending axially from the free end of the shaft.

9. The apparatus of claim 8 further comprising, in combination: a housing end having an opening formed therein; means for rotatably mounting the shaft in the opening of the housing end, with the housing end located intermediate the keyway and the opposite end of the shaft; and a C-face formed on the housing end for mounting engagement with a complementary mounting face formed on the shaft carried article.

10. The apparatus of claim 9 further comprising, in combination: an interface element mounted on and rotatable with the shaft and located intermediate the housing end and the opposite end of the shaft; and a further housing portion including a face for selectively interfacing with the interface element, with the housing portion being removably secured relative to the housing end allowing access to the opposite end of the shaft when the housing portion is removed.

11. The apparatus of claim 9 further comprising, in combination: a friction disc, with the housing portion including an opening formed therein; and means for rotatably mounting the friction disc in the opening of the housing portion, with the face formed on the friction disc.

12. The apparatus of claim 11 wherein the interface element is axially slideable on the shaft; and wherein the apparatus further comprises, in combination: a friction ring in a fixed position relative to the housing end and for selectively interfacing with the interface element, with the interface element located intermediate and axially slideable between the face and the friction ring.

13. The apparatus of claim 5 wherein the first and second sidewalls are planar and parallel, with the bottom wall being perpendicular to the sidewalls, with the first and second sides being planar and parallel, with the top and the bottom being planar and perpendicular to the sides.

14. The apparatus of claim 1 wherein the axially moving means comprises, in combination: a threaded counterbore in the shaft extending from the opposite end and having an axial extent less than the axial bore; and a threaded portion for threadable receipt in the threaded counterbore, with rotation of the threaded portion moving the push rod in the axial bore.

15. The apparatus of claim 14 wherein the threaded portion is integral to the push rod.

16. The apparatus of claim 14 wherein the first and second sidewalls are planar and parallel, with the bottom wall being perpendicular to the sidewalls, with the first and second sides being planar and parallel, with the top and the bottom being planar and perpendicular to the sides.

17. The apparatus of claim 1 wherein the free end of the shaft is adapted to axially slide in the shaft carried article, with the keyway extending axially from the free end of the shaft.

18. The apparatus of claim 17 further comprising, in combination: a housing end having an opening formed therein; means for rotatably mounting the shaft in the opening of the housing end, with the housing end located intermediate the keyway and the opposite end of the shaft; and a C-face formed on the housing end for mounting engagement with a complementary mounting face formed on the shaft carried article.

19. The apparatus of claim 18 further comprising, in combination: an interface element mounted on and rotatable with the shaft and located intermediate the housing end and the opposite end of the shaft; and a further housing portion including a face for selectively interfacing with the interface element, with the housing portion being removably secured relative to the housing end allowing access to the opposite end of the shaft when the housing portion is removed.

20. The apparatus of claim 1 wherein the first and second sidewalls are planar and parallel, with the bottom wall being perpendicular to the sidewalls, with the first and second sides being planar and parallel, with the top and the bottom being planar and perpendicular to the sides.

\* \* \* \* \*